Feb. 6, 1934.    G. H. IRWIN    1,946,165
PNEUMATICALLY OPERATED CUT-OUT FOR ALTERNATING CURRENT MOTORS
Filed July 5, 1932    2 Sheets-Sheet 1
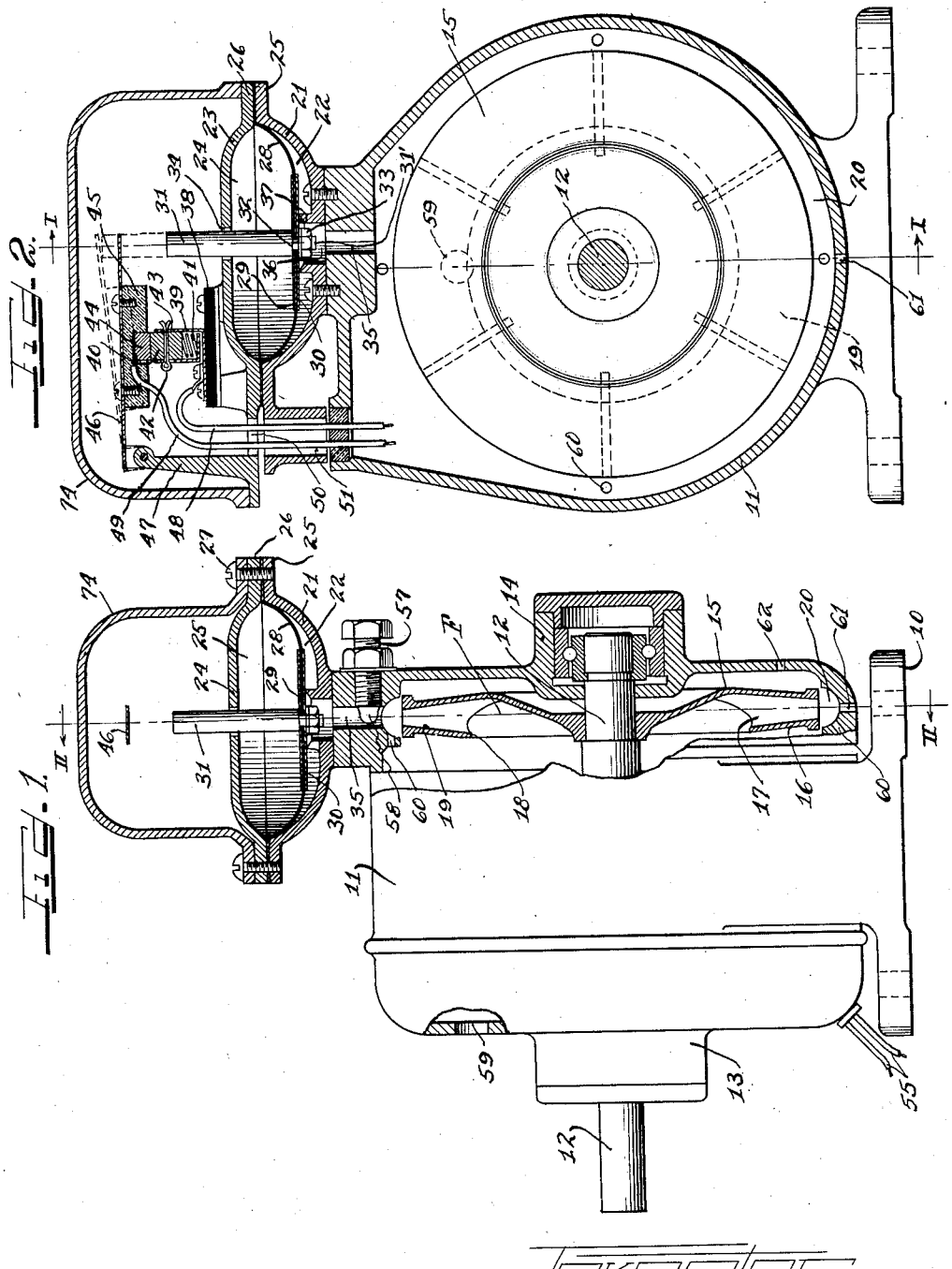
Inventor
George H. Irwin.
by Charles H. Hills Atty

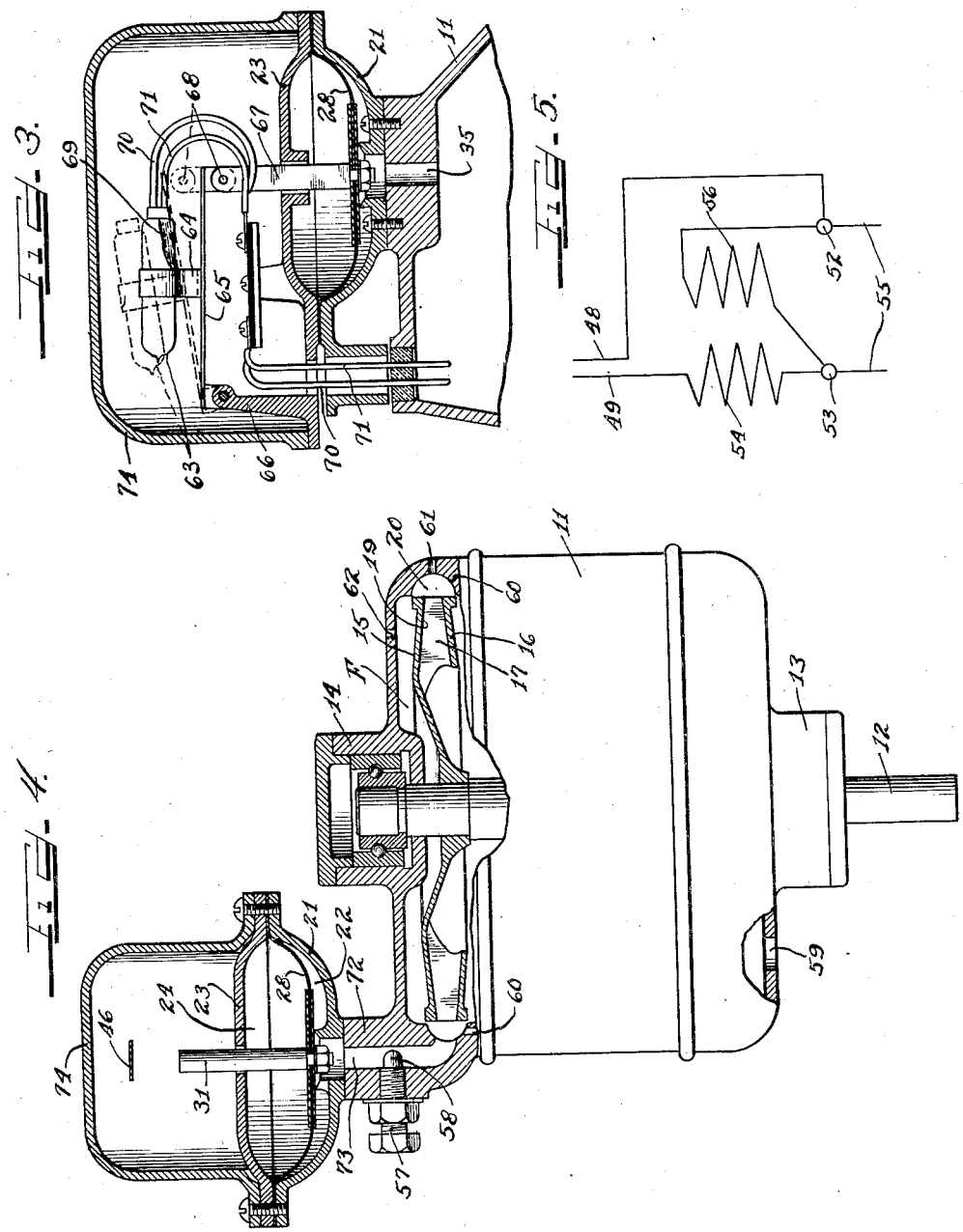

Patented Feb. 6, 1934

1,946,165

UNITED STATES PATENT OFFICE 1,946,165

PNEUMATICALLY OPERATED CUT-OUT FOR ALTERNATING CURRENT MOTORS

George H. Irwin, Chicago, Ill.

Application July 5, 1932. Serial No. 620,758

5 Claims. (Cl. 172—279)

My invention relates to the operation of alternating current motors of the single phase type and covers particularly pneumatically controlled switch mechanism for cutting the starting winding in or out depending upon the speed of the motor.

An important object of my invention is to provide more reliable and efficient means for securing complete and accurate severance of the starting winding circuit of a motor at a given time or at an attained speed previously determined as best for the size and type and electrical characteristics of the motor.

Heretofore mechanisms driven by the motor and controlled by centrifugal force have been employed for engaging or disengaging contacts for controlling the starting circuit, such engagement or disengagement being more or less gradually effected thus creating arcing conditions which soon wear away the switch contacts. Furthermore such centrifugal mechanism involves bearings which it is difficult to lubricate and which soon dry out thus destroying the accuracy of operation of the mechanism and requiring frequent repairing and readjustment. Again, with such centrifugally operated mechanism it is impossible to accurately balance the rotor or armature of the motor the result being a critical vibratory condition of the armature during the entire running period of the motor as well as during the starting period thereof. It is therefore another important object of the invention to overcome these disadvantages in prior art structures and to provide a pneumatically operated and controlled cut-out or switch with the elimination of destructive arcing and in which all the switch parts come to rest and remain stationary while the motor is in operation.

Another object is to provide simple switch mechanism and operating means therefor comprising a diaphragm controlled by the air pressure delivered by a fan driven by the motor to be controlled.

A further object is to provide an arrangement in which a balanced fan is mounted on the motor shaft within the motor housing with the arrangement such that, after operation of the diaphragm to control the switch to cut out the starting winding, the fan will operate to circulate air within or through the motor housing around the operative parts therein in order to keep the motor structure cool.

The above enumerated and other features of my invention are incorporated in the structure disclosed on the drawings, in which drawings Figure 1 is a side elevation of a horizontal motor partly in vertical longitudinal section on line I—I of Figure 2;

Figure 2 is a section on plane II—II of Figure 1;

Figure 3 is a section similar to Figure 2 of the upper part of the motor structure showing a modified form of switch;

Figure 4 is a side elevation of a vertical motor showing my invention applied thereto; and Figure 5 is the electrical circuit diagram.

Figures 1 and 2 show a horizontal motor comprising the base 10 and the housing 11 through which extends the shaft 12 supporting the armature (not shown) and journalled in suitable bearing structures 13 and 14.

Adjacent to the bearing structure 14 a fan rotor structure F is secured on the motor shaft and this fan rotor may be of any suitable type comprising the continuous outer wall or disc 15, the inner annular wall 16, and the radial vanes 17 between these walls. The annular inner wall 16 surrounds the axial air inlet 18 to the fan and between the vanes 17 are the radial air outlets 19. The fan inlet communicates with the interior of the motor housing and the outlets 19 communicate with the annular outlet channel 20 formed in the motor housing around the fan.

Secured, preferably detachably, on top of the motor housing above the fan is a lower frame 21 forming a lower diaphragm chamber 22, and supported by this lower frame is an upper frame 23 forming an upper diaphragm chamber 24. The flanges 25 and 26 on these frames are held together as by means of screws 27 and clamp between them the peripheral sections of a diaphragm 28, which diaphragm may be of light impervious material such as silk, or other suitable material or fabric. Upper and lower washers 29 and 30 receive between them the central part of the diaphragm and are secured on the reduced end 31' of a vertical stem 31 between the shoulder 32 on the stem and a nut 33 engaging the end 31' which is threaded, the washers thus securely clamping the diaphragm between them. The stem 31 extends upwardly a distance above the top of the frame 23 through the opening 34 in the frame.

Through the top of the fan housing and in alignment with the center of the diaphragm is the air passageway 35 which communicates with the lower diaphragm chamber 22 through the opening 36 in the bottom of the frame 21, the opening being surrounded by a flange 37 forming a seat for the diaphragm when in its lower relaxed position, the upper edge of the flange being preferably tapered to reduce the seating area so that there may be no tendency for the diaphragm lower washer to stick to the seat.

When the motor is started and the fan is rotated air under pressure will be delivered into the bottom diaphragm chamber 22 and the diaphragm will be raised to shift its stem 31 upwardly, and on the upper diaphragm housing frame 23 is mounted suitable switch mechanism to be controlled by the diaphragm stem. The switch mechanism disclosed in Figures 1 and 2 comprises a base 38 insulated from the frame 23 and supporting a terminal frame or cup 39 for receiving the contact member 40 which may be a block of carbon. Between the contact block and the bottom of the cup is a compression spring 41 tending to urge the contact block outwardly, the vertical movement of the block in the cup being limited by a pin 42 extending through the block and through the vertical slots 43 in the opposite sides of the cup.

For cooperating with the yieldable contact block 40 to control the motor starting circuit, an upper contact member 44 is provided which may be of carbon or of metal and seated in a block 45 of insulating material secured to an arm 46 which is hinged or pivoted at one end on a post 47 on the frame 23, the other end of this arm being above the path of the diaphragm stem 31. When the diaphragm is down and the arm is released from the stem the contact 44 will be held in engagement with the contact 40 but when the diaphragm is raised the stem engages with and swings the arm upwardly to disconnect the contact 44 from the contact 40. Conductors 48 and 49 extend from the contacts 40 and 44 through passageways 50 and 51 in the frames 23 and 21 respectively and into the motor housing for connection with the motor circuit. As shown in Figure 5 the conductor 48 connects directly with the terminal 52 while the conductor 49 which connects with the terminal 53 includes the motor starting winding 54, the terminals 52 and 53 being connected with electric current supply circuit 55. The motor field winding 56 is connected with the terminals 52 and 53.

When the motor is at rest the switch blade structure comprising the arm or lever 46, the block 45 and the contact 44, is held by gravity in its lower position with contact 44 in engagement with the yieldable contact 40 and then when the motor is connected with the electrical supply circuit 55 current will flow through the motor field winding 56 and also through the starting winding 54 and the motor will be started. As the motor increases in speed, the fan sets up a pressure in the housing annular space 20 and the pressure against the under side of the diaphragm causes it to rise and shift the stem 31 upwardly so that as the motor reaches the predetermined cut-out speed the switch blade structure will be engaged and swung upwardly to disconnect its contact 44 from the contact 40 to cause opening of the circuit through the starting winding at the time the motor has reached the predetermined running speed, and so long as this speed is maintained the fan will hold up the pressure under the diaphragm and the switch blade structure will be held in open position. Should the motor be disconnected from circuit, or for other reasons come to a stop, the air pressure will be withdrawn and the diaphragm will drop to release the switch blade structure for reclosure of the starting circuit.

In order that the response of the switch to the air pressure may occur at the proper time, air flow regulating means are provided for the duct 35, the means shown being in the form of a screw 57 having its valve end 58 extending into the duct for adjusting the cross area of the duct to thereby determine the rate of air flow therethrough.

The switch mechanism has no direct connection whatever with the motor operating parts and is controlled solely by the pressure of the air delivered by the fan, the switch being at rest and stationary during the entire time that the motor is running after starting thereof. The fan is a balanced structure and when the motor is in operation it will assist in keeping the armature structure balanced and centered and running smoothly.

The motor housing at the side opposite to the fan side, may have one or more air inlet or vent openings 59 through which air may be drawn into the motor housing when the fan is operated. The space 20, which receives the air from the fan for delivery to the diaphragm chamber when the motor is operating, may be connected by one or more passageways 60 with the interior of the motor housing and then, after the diaphragm has been raised its full distance and the motor has been started, the air blown out by the fan into the space 20 will be circulated through the fan passageways 19 to keep the air within the motor housing in circulation and uniform distribution to prevent local overheating. The fan discharge space 20 may also be connected by one or more passageways 61 with the exterior of the motor housing so that there may be a circulation or flow of air through the housing from the inlet 59 and out through the passageways 61, this flow of fresh air through the housing serving to keep the motor cool. One or more vent openings 62 may also be provided in the outer wall of the motor housing adjacent to the fan for ventilation of the space between the fan and such wall. In my arrangement the fan thus serves the dual purpose of controlling the circuit for the motor starting winding, and of circulating air within or through the motor housing to keep the motor cool.

On Figure 3 I have shown a modified form of switch which may be advantageously used with the pneumatic controlling means. The fan and diaphragm arrangement are substantially the same as in Figures 1 and 2 but a mercury switch is used instead of the swinging switch blade structure of Figures 1 and 2. The mercury switch bulb 63 is secured in a bracket 64 mounted on the lever 65 pivoted at one end on the post 66 on the upper diaphragm frame 23, the stem 67 extending from the diaphragm 28 being directly connected with the lever 65 by a pivot connection 68. When the motor is not running and the diaphragm is in its lower position the lever 65 will be swung down and the mercury bulb will be tilted for connection of the mercury 69 with the inner ends of the leads 70 and 71 which are connected with the motor windings and circuit in the same manner as are the leads 49 and 48 in the structure of Figures 1 and 2 as indicated in Figure 5. When the diaphragm is down the starting winding 54 is in circuit and the motor is started and the fan is driven and as the pressure below the diaphragm increases the lever 65 will be swung upwardly and the mercury bulb tilted and when the diaphragm reaches its upper position the bulb will be tilted far enough for flow of the mermury to the other end thereof to disconnect from the leads 70 and 71, and the starting winding will be disconnected from circuit for normal operation of the motor. When the motor is disconnected from circuit the diaphragm falls and the switch bulb will be tilted for reengagement of the mercury with the leads to reclose the starting winding circuit. The mercury bulb is so adjusted that when it is tilted far enough for movement of the mercury to open the starting winding circuit the motor will be at its predetermined service or running speed.

Figure 4 shows my invention applied to a vertical motor. Here the fan rotates in a horizontal plane within the horizontally disposed housing and, in order that the diaphragm stem 31 may be vertical and the switch blade structure properly arranged for engagement by the stem, the end 72 of the fan housing is turned upwardly for supporting the diaphragm and switch housing. This upturned end 72 will then support the adjustable member 58 for controlling the rate of air flow through the duct 73 to the lower diaphragm chamber. In other respects the structure and operation of Figure 4 is the same as that shown in Figures 1 and 2. In order to protect the switch mechanisms in the various structures shown a cover 74 may be provided which may be supported on the upper diaphragm frame 23.

I thus produce simpler, more reliable and more efficient controlling means for the starting circuit of induction motors in which the main controlling element is air under pressure delivered by a fan driven by the motor to be controlled, the fan serving also as a means for circulating cooling air within and through the motor housing. I have shown practical and efficient embodiments of the features of my invention but I do not desire to be limited to the exact structure, arrangement, and operation shown and described as changes and modifications may be made without departing from the scope of the invention as defined in the appended claims.

I claim as follows:

1. A unitary alternating current motor structure comprising a motor frame, a rotor, a starting winding and a running winding, a fan rotor within the motor frame connected to be driven by the motor rotor, a switch structure mounted on said motor frame, and means responsive to pressure set up in said motor frame by said fan rotor for operating said switch structure to open the circuit of said starting winding after a predetermined pressure has been reached.

2. A unitary alternating current motor structure comprising a motor frame, a rotor and running and starting windings, a fan within the motor frame for circulating the air in said frame to prevent heat localization, a switch structure mounted on said motor frame connected with said starting winding, and means responsive to the pressure set up by said fan for operating said switch to open the starting winding circuit when a predetermined pressure has been reached.

3. A unitary alternating current motor structure comprising a motor frame, a rotor, and starting and running windings, an air circulating and pressure-producing device within said motor frame driven by the motor rotor, a switch mounted on said motor frame for controlling the circuit of the starting winding, means responsive to the generated air pressure for causing operation of said switch to open the starting winding circuit after the motor has been started, and means for regulating the air flow to said pressure responsive means for regulating the time of control thereby of said switch mechanism.

4. A unitary electric motor structure comprising a motor frame, a rotor, and motor running and starting windings, a fan structure within the motor frame driven by the motor rotor to create air pressure, a switch mounted on the motor frame for controlling the starting winding, means responsive to the air pressure to set said switch for control of said starting winding, and means whereby said fan structure will function after setting of said switch to circulate air in said motor frame to prevent heat localization.

5. The combination with an alternating current motor comprising a motor frame, a rotor, and a starting and a running winding, of a pneumatically operable switch for controlling a circuit for said starting winding, means providing a fan chamber within the motor frame, a fan within said chamber driven by said rotor for furnishing pressure for operating said switch, an outlet passage from said chamber leading to said pneumatically operable switch, and regulating means in said passage for controlling the flow of air therethrough.

GEORGE H. IRWIN.